United States Patent [19]
Breen

[11] Patent Number: 6,149,543
[45] Date of Patent: Nov. 21, 2000

[54] COMPOUNDER ASSEMBLY WITH CONTROLLABLE OVERRUNNING CLUTCH

[75] Inventor: Timothy W. Breen, East Syracuse, N.Y.

[73] Assignee: New Venture Gear, Inc., Troy, Mich.

[21] Appl. No.: 09/398,483

[22] Filed: Sep. 17, 1999

[51] Int. Cl.[7] .................................................. F16H 3/44
[52] U.S. Cl. ...................... 475/269; 475/311; 475/312; 192/12 R; 192/13 R
[58] Field of Search .................... 475/269, 311, 475/305, 312, 276; 192/12 R, 13 R, 17 R

[56] References Cited

U.S. PATENT DOCUMENTS

| | | | |
|---|---|---|---|
| 2,930,462 | 3/1960 | Willis | 192/53 |
| 2,985,036 | 5/1961 | Forster | 74/740 |
| 3,396,610 | 8/1968 | Rich, Jr. et al. | 74/740 |
| 3,444,761 | 5/1969 | Wickman | 74/740 |
| 3,543,897 | 12/1970 | Lemke et al. | 192/53 |
| 4,225,024 | 9/1980 | Kuzma | 192/53 F |
| 4,282,957 | 8/1981 | Sugimoto et al. | 192/9 |
| 4,294,338 | 10/1981 | Simmons | 192/4 A |
| 4,404,869 | 9/1983 | Numazawa et al. | 74/740 |
| 4,413,715 | 11/1983 | Michael et al. | 192/53 F |
| 4,416,168 | 11/1983 | Arai et al. | 74/740 |
| 4,455,890 | 6/1984 | Kuramochi et al. | 74/783 |
| 4,480,499 | 11/1984 | Kubo et al. | 74/695 |
| 4,484,494 | 11/1984 | Sakakibara | 74/781 R |
| 4,528,872 | 7/1985 | Umemoto et al. | 74/781 R |
| 4,567,788 | 2/1986 | Miller | 74/789 |
| 4,598,599 | 7/1986 | Ikemoto | 74/411.5 |
| 4,649,771 | 3/1987 | Atkinson et al. | 74/781 R |
| 4,676,123 | 6/1987 | Kubo et al. | 74/695 |
| 4,798,103 | 1/1989 | Eastman et al. | 74/740 |
| 4,830,159 | 5/1989 | Johnson et al. | 192/53 G |
| 4,976,671 | 12/1990 | Andersson | 475/299 |
| 5,085,303 | 2/1992 | Frost | 192/53 F |
| 5,397,282 | 3/1995 | Weidman | 475/205 |
| 5,466,195 | 11/1995 | Nogle et al. | 475/55 |
| 5,503,603 | 4/1996 | Adam et al. | 475/204 |
| 5,588,928 | 12/1996 | Koivunen | 475/126 |
| 5,651,435 | 7/1997 | Perosky et al. | 192/4 C |
| 5,868,644 | 2/1999 | Beim | 475/271 |
| 5,975,263 | 11/1999 | Forsyth | 192/53.32 |
| 6,056,659 | 5/2000 | McCarthy et al. | 475/116 |

FOREIGN PATENT DOCUMENTS

| | | |
|---|---|---|
| 55-148619 | 11/1980 | Japan . |
| 58-005561 | 1/1983 | Japan . |

*Primary Examiner*—Charles A Marmor
*Assistant Examiner*—Tisha D. Waddell
*Attorney, Agent, or Firm*—Harness, Dickey & Pierce, P.L.C.

[57] ABSTRACT

A transmission compounder assembly having a one-way clutch between an input shaft and an output shaft to establish a direct-ratio drive path therebetween. A planetary gearset can be selectively engaged to establish a compound-ratio drive path between the shafts. The planetary gearset includes a sun gear, a ring gear fixed to the output shaft, a carrier fixed to the input shaft, and a plurality of planet gears rotatably supported from the carrier and meshed with both the ring gear and the sun gear. A band brake is provided for selectively braking the sun gear. A controllable overrunning clutch is mounted between the carrier and the sun gear and can be selectively shifted between a locked mode and a released mode. The compounder assembly further includes an actuator for controlling actuation of the band brake and the overrunning clutch. The compounder assembly is operable in a direct drive mode wherein the band brake is released and the overrunning clutch is in its locked mode to couple the sun gear for common rotation with the carrier. As such, the one-way clutch functions to transfer rotary power from the input shaft to the output shaft while the overrunning clutch absorbs any reverse relative rotation. In addition, an overdrive mode is established by shifting the overrunning clutch into its released mode and engaging the band brake such that the sun gear is braked and the ring gear drives the output shaft at a non-direct speed relative to the input shaft.

25 Claims, 4 Drawing Sheets

COMPOUNDER ASSEMBLY WITH CONTROLLABLE OVERRUNNING CLUTCH

FIELD OF THE INVENTION

The present invention relates to automatic multi-speed transmissions for use in motor vehicles and, more particularly, to a compounder assembly that is adapted to provide a compounded drive ratio to an existing automatic transmission.

BACKGROUND OF THE INVENTION

Motor vehicle transmissions commonly employ an add-on "overdrive" gearbox to provide an additional gear ratio. Some applications use this overdrive gearbox to "compound" the ratio of additional gears. Typically, such "compounders" include a planetary gearset and one or more clutches that can be selectively actuated to establish one of a direct-drive mode and an overdrive mode. As is known, the direct drive mode provides a one-to-one gear ratio which enables the compounder to, in effect, be by-passed by the transmission. On the other hand, the overdrive mode provides a gear ratio other than one-to-one which provides the transmission with a simple and relatively inexpensive additional drive gear.

In many compounders, the input shaft and the output shaft are coaxially disposed in a housing. A direct drive device is employed to directly interconnect the input shaft to the output shaft so as to establish the direct drive mode. Overrunning (i.e., one-way) clutches are typically used for the direct drive device. An overdrive device is similarly employed to interconnect the input shaft to the output shaft so as to establish the overdrive mode. In many instances, the overdrive device includes planetary gearset and a selectively engageable mode clutch. In particular, the verdrive mode is commonly achieved by actuating the mode clutch to fix a sun gear of the planetary gearset to the housing, whereby an output member of the planetary earset is driven at an increased speed ratio. Some examples of conventional compounders are disclosed in U.S. Pat. Nos. 4,484,494; 4,567,788; 4,649,771; 4,798,103 and 4,976,671. While such compounders have proven to work satisfactorily for their intended purpose, a need exists to minimize packaging and complexity while concomitantly advancing the state of the art.

SUMMARY OF THE INVENTION

In accordance with the broad teachings of this invention, a compounder assembly is disclosed which is adapted for use in a motor vehicle driveline in association with a transmission to provide at least one additional gear ratio. The compounder assembly comprises a housing having an input shaft and an output shaft rotatably supported therein. A first one-way clutch is operable to establish a directratio drive connection between the shafts. In addition, the compounder assembly includes a planetary gearset comprised of a sun gear, a ring gear fixed to the output shaft, a carrier fixed to the input shaft, and a plurality of planet gears rotatably supported from the carrier and meshed with both the ring gear and the sun gear. A band brake can be selectively actuated to brake the sun gear and establish a compound-ratio drive connection between the shafts. A second one-way clutch is operable to couple the carrier to the sun gear to prevent the output shaft from overrunning the input shaft. Furthermore, the second one-way clutch can be selectively released to permit relative rotation between the sun gear and the carrier. The compounder assembly further includes an actuator for controlling release of the second one-way clutch and actuation of the band brake. The compounder assembly is operable in a direct drive mode wherein the band brake is released and the second one-way clutch is locked. As such, the first one-way clutch functions to transfer rotary power from the input shaft to the output shaft while the second one-way clutch prevents the output shaft from overrunning the input shaft. In addition, an over-drive mode is established by releasing the second one-way clutch and engaging the band brake such that the sun gear is braked and the ring gear drives the output shaft at a non-direct speed relative to the input shaft.

In accordance with one preferred construction, the first one-way clutch is installed directly between the input shaft and the output shaft with an inner race element fixed to the input shaft, an outer race element fixed to the output shaft, and a set of locking elements disposed therebetween.

According to an alternative embodiment of the present invention, the first one-way clutch is installed between the input and output members of the planetary gearset with the inner race element fixed to the carrier and the outer race element fixed to the ring gear.

According to yet another alternative embodiment of the present invention, a controllable bi-directional overrunning clutch is used in place of the first and second one-way clutches.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
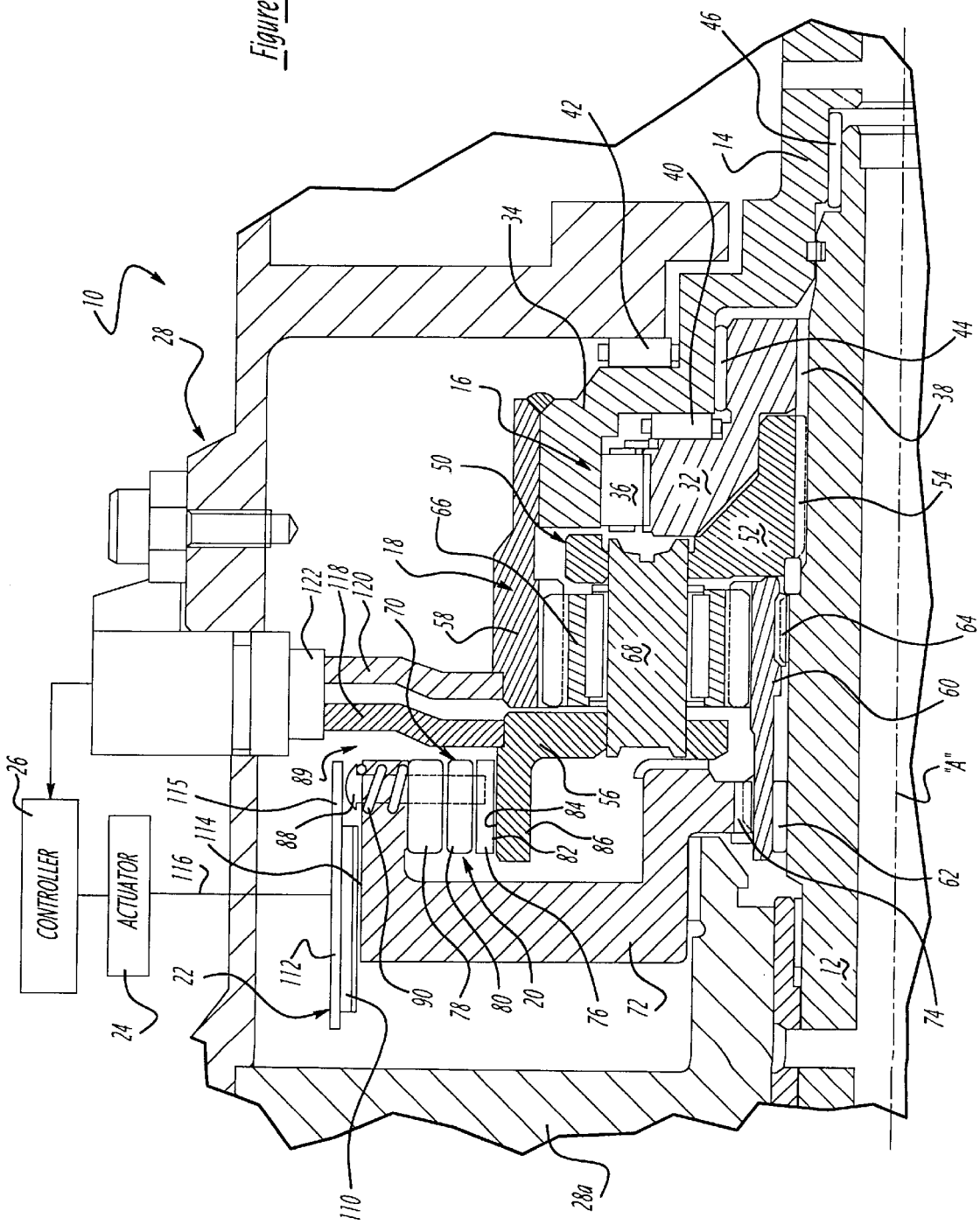
FIG. 1 is a sectional view illustrating a compounder assembly according to a first embodiment of the present invention.

Referring to FIG. 1, an add-on compounder assembly 10 according to a first embodiment of the present invention is illustrated. Compounder assembly 10 is adapted to be used either in conjunction with a conventional automatic transmission of an automotive vehicle or as an integral part of such a transmission. The primary components of compounder assembly 10 include an input shaft 12, and output shaft 14, a first one-way clutch 16, a planetary gearset 18, a second one-way clutch 20, a band brake 22, an actuator 24, and a mode shift controller 26. Input shaft 12 and output shaft 14 are rotatably supported within a housing 28 and are coaxially aligned such that they rotate about a common longitudinal axis "A". In automotive drivetrain applications where compounder assembly 10 is installed between the torque converter and the transmission, input shaft 12 is driven by the torque converter output shaft while output shaft 14 drives the transmission input shaft. Alternatively, if compounder assembly 10 is installed between the transmission and the driveshaft, then input shaft 12 is driven by the transmission output shaft and output shaft 14 drives the driveshaft. As such, compounder assembly 10 is adapted for installation at and connection to either the input or the output of the transmission to accommodate particular packaging requirements. Preferably, compounder assembly 10 is a pre-assembled unit that is installed in a housing extension or within a chamber provided within housing 28.

With continued reference to FIG. 1, first one-way clutch 16 is operably arranged to selectively transfer rotary power from input shaft 12 to output shaft 14 for establishing a direct-ratio drive connection therebetween. First one-way clutch 16 includes an inner race element 32, an outer race element 34, and a plurality of locking elements 36 disposed therebetween. Inner race element 32 is fixed to input shaft 12 at splined connection 38 for rotation therewith. Outer race element 34 is formed integral with, or secured to, output shaft 14 for rotation therewith. Locking elements 36 are arranged to automatically engage locking surfaces between inner race element 32 and outer race element 34 when a driving torque is transmitted from input shaft 12 to output shaft 14. However, locking elements 36 are automatically released from the locking surfaces when a driving torque is transmitted in the opposite direction. Thus, input shaft 12 will drive output shaft 14 in a first direction, but output shaft 14 will overrun input shaft 12 in the second direction. As seen, an inner thrust bearing assembly 40 is positioned between corresponding radial face surfaces on inner race element 32 and outer race element 34 while an outer thrust bearing assembly 42 is positioned between corresponding radial face surfaces on outer race element 34 and a wall portion of housing 28. A journal bushing 44 is shown disposed between inner race element 32 and outer race element 34 of oneway clutch 16, and a journal bushing 46 is disposed between pilot surfaces on input shaft 12 and output shaft 14.

As noted, compounder assembly 10 includes planetary gearset 18 which is operable to selectively interconnect input shaft 12 and output shaft 14 for establishing a compound-ratio drive connection therebetween. It should be appreciated that the compound-ratio drive connection defines a gear ratio other than one-to-one. Planetary gearset 18 includes an input member driven by input shaft 12, a reaction member, and an output member driving output shaft 14. In this regard, the input member of planetary gearset 18 includes a planet carrier 50 having a first carrier ring 52 fixed to input shaft 12 at splined connection 54 and which is interconnected to a second carrier ring 56. The output member of planetary gearset 18 includes a ring gear 58 that is integral with, or secured to, outer race element 34 of first one-way clutch 16 for rotation with output shaft 14. A sun gear 60 acts as the reaction member of planetary gearset 18 and is rotatably supported on input shaft 12 by a pair of journal bushings 62 and 64. A plurality of planet gears 66 are rotatably supported by planet carrier 50 and are each meshed with ring gear 58 and sun gear 60. Specifically, each planet gear 66 is rotatably supported by anti-friction bearings on a pinion shaft 68 which extends between carrier rings 52 and 56.

Figure 2:
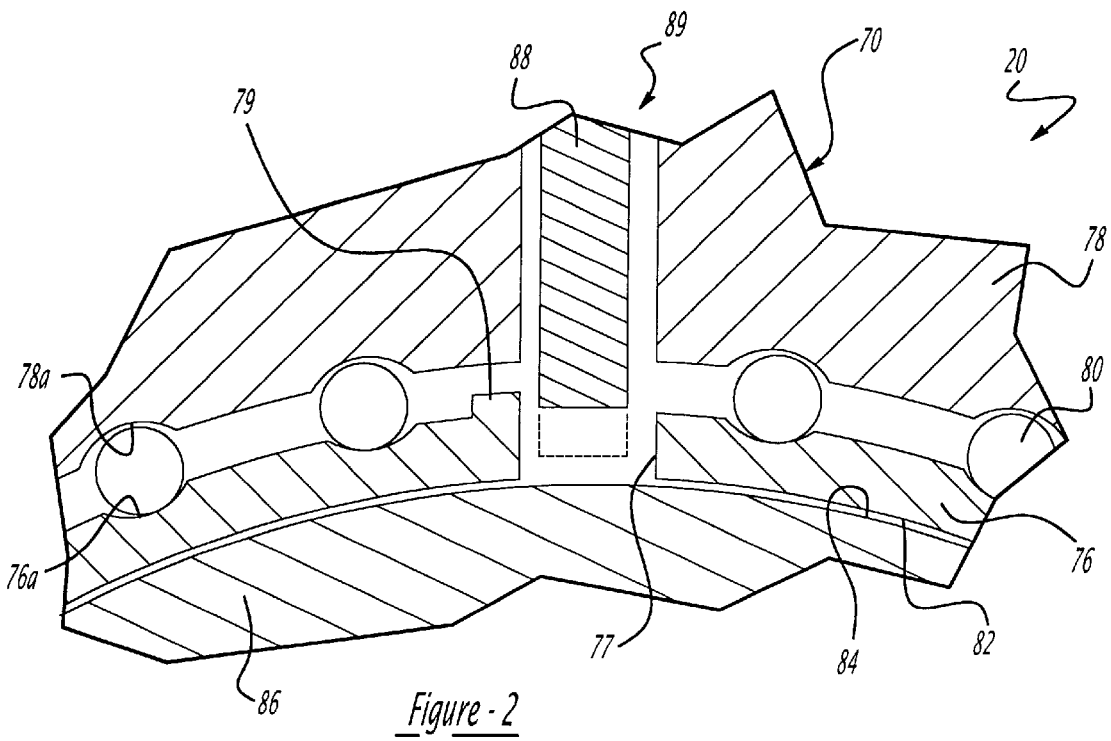
FIG. 2 is a partial sectional of the controllable one-way clutch assembly associated with the compounder assembly shown in FIG. 1.

According to the present invention, second one-way clutch 20 is a controllable overrunning clutch assembly 70 operable for selectively coupling and uncoupling planet carrier 50 to a brake drum 72 associated with band brake 22. The term "controllable" is used to define the dual function of second one-way clutch 20 wherein operation in a first or "locked" mode results in a one-way clutching action while operation in a second or "released" mode permits free-wheeling in both directions. Referring to FIGS. 1 and 2, overrunning clutch assembly 70 is shown to include an inner ring 76, an outer ring 78, and a plurality of locking elements 80 disposed therebetween. Inner ring 76 is a C-shaped split ring which defines a slot 77 and an upstanding tang 79. Inner ring 76 has a inner cylindrical surface 82 which is supported on an outer cylindrical surface 84 of a drum segment 86 on second carrier ring 56. Outer ring 78 is fixed to brake drum 72 for rotation therewith. In turn, brake drum 72 is fixed for rotation with sun gear 60 via a splined connection 74 and is supported by a bulkhead 28a for rotation relative to housing 28. Complementary arcuate locking surfaces 76a and 78a are respectively formed on the outer wall surface of inner ring 76 and the inner wall surface of outer ring 78 which are alignable to define roller pockets. Preferably, locking elements 80 are rollers that are disposed in the pockets for engagement with portions of opposed locking surfaces 76a and 78a. As will be detailed, locking elements 80 are arranged to lockingly engage locking surfaces 76a and 78a when a driving torque is transmitted from ring gear 58 back through planetary gearset 18. However, locking elements 80 are released for rotation in the roller pockets when a drive torque is transferred from input shaft 12 to output shaft 14. Thus, second one-way clutch 20 functions to lock sun gear 60 for common rotation with carrier 50 when output shaft 14 attempts to overrun input shaft 12 during a "coast" condition.

Overrunning clutch assembly 70 includes a mode shift mechanism 89 which can be selectively actuated to shift clutch assembly 70 between its locked mode and its released mode. With overrunning clutch assembly 70 in its locked mode, it acts as a one-way clutch in the manner described above to prevent relative rotation between sun gear 60 and carrier 50 in a first direction while permitting relative rotation therebetween in the opposite direction. In contrast, overrunning clutch assembly 70 functions in its released mode to permit relative rotation in both directions, that is, it permits bidirectional free-wheeling between brake drum 72 and carrier 50. Mode shift mechanism 89 includes a pin 88 extending through aligned apertures formed in brake drum 72 and outer ring 78, and a spring 90 acting on a head segment of pin 88. Spring 90 functions to normally bias pin 88 in an outward direction to a first position (shown by solid lines in FIG. 2) whereat the terminal end of pin 88 is disengaged from slot 77 in inner ring 76. With pin 88 in its first position, overrunning clutch assembly 70 functions in its locked mode. That is, pin 88 will engage tang 79 for preventing rotation of inner ring 76 relative to outer ring 78 in a first (i.e., clockwise) direction while permitting limited relative rotation of inner ring 76 in a second (i.e., counterclockwise) direction. Thus, engagement of pin 88 with tang 79 due to rotation of inner ring 76 in the first direction acts to couple outer ring 78 for common rotation with inner ring 76, thereby centering rollers 80 in the roller pockets to permit carrier 50 to rotate relative to sun gear 60. Conversely, relative rotation of inner ring 76 in the second direction causes rollers 80 to ride up and engage portions of opposed locking surfaces 76a, 76b for clamping inner ring 76 to second carrier ring 56, thereby coupling sun gear 60 to carrier 50.

Pin 88 can be moved in an inward direction from its first position to a second position (shown in FIG. 2 by phantom line), in opposition to the biasing of spring 90. In its second position, the terminal end of pin 88 is positioned within slot 77 to locate inner ring 76 in a centered position relative to outer ring 78. As such, outer ring 78 is coupled for common rotation with inner ring 76, thereby centering locking elements 80 in the roller pockets to permit bidirectional relative rotation between planet carrier 50 and sun gear 60. Accordingly, overrunning clutch assembly 70 is operable in its released mode to permit free-wheeling in both directions.

With continued reference to FIG. 1, band brake 22 is shown to include brake strips 110 of a suitable clutch or brake friction material that are mounted on movable calipers 112 disposed about a circumferential friction surface 114 of brake drum 72. Actuator 24 is operable under the control of controller 26 to move calipers 112 between a direct-drive position and an over-drive position. In particular, movement of calipers 112 from the direct-drive position (shown) toward the over-drive position causes a flange 115 to engage pin 88 and move it from its first position to its second position. Such movement of calipers 112 also causes brake strips 110 to move into engagement with friction surface 114 to control speed retardation of sun gear 60, thereby also controlling the speed of ring gear 58 and thus the speed at which output shaft 14 is driven. Actuator 24 can be any suitable bidirectional power-operated (i.e., motor-driven actuator, hydraulically-actuated servomotor, etc.) device or system which, as indicated by leadline 116, controls movement of calipers 112.

In accordance with one control strategy, actuator 24 is a two state (i.e., on/off) device having means for locating calipers 112 in one of its two positions. In particular, calipers 112 may be located in the direct-drive position whereat flange 115 is disengaged from pin 88 and brake strips 110 are disengaged from friction surface 114. With calipers 112 in the direct-drive position, pin 88 is in its first position such that overrunning clutch assembly 70 is operating in its locked mode and band brake 22 is released to permit sun gear 60 to rotate unrestricted relative to housing 28. In contrast, calipers 112 may be moved by actuator 24 to its over-drive position. Such movement of calipers 112 initially causes flange 115 to engage and then move pin 88 to its second position for shifting overrunning clutch assembly 70 into its released mode. Continued movement of calipers toward the over-drive position causes brake strips 110 to become tightly clamped with friction surface 114 so as to apply a braking force on brake drum 72 for braking sun gear 60 against rotation. Thus, band brake 22 is operable in a "released" mode when calipers 112 are located in the direct-drive position and is further operable in a "braked" mode when calipers 112 are located in the over-drive position.

Controller 26 functions to control actuation of actuator 24 in response to a shift signal indicative of the particular drive mode selected for compounder assembly 10. Controller 26 can be part of the on-board transmission controller associated with modern automatic transmissions or, in the alternative, a distinct control unit. As an option, it is further contemplated that actuator 24 could be adjustably modulated to regulate the braking force between its minimum and maximum braking force levels for controllably modulating the speed ratio between input shaft 12 and output shaft 14.

An input tone wheel 118 is fixed to second carrier ring 56 of planet carrier 50 and an output tone wheel 120 is shown fixed to ring gear 58. A sensor 122, such as a Hall effect or variable reluctance device, provides signals representative of the rotary speed of tone wheels 118 and 120 to controller 26 for use in controlling and monitoring actuation of actuator 24.

When it is desired to operate compounder assembly 10 in a direct-drive mode for driving output shaft 14 at the same speed as input shaft 12, calipers are located in the direct-drive position such that overrunning clutch assembly 70 is operating in its locked mode and band brake 22 is operating in its released mode. With compounder assembly 10 functioning in its direct-drive mode, drive power is transmitted from input shaft 12 through first one-way clutch 16 to output shaft 14. However, when a coasting condition occurs with compounder assembly 10 operating in the direct-drive mode, overrunning clutch assembly 70 acts to absorb the load and prevent relative motion between sun gear 60 and planet carrier 50, thereby maintaining the direct speed ratio. When it is desired to operate compounder assembly 10 in an over-drive mode, calipers 112 are moved to the over-drive position such that overrunning clutch assembly 70 is shifted into its released mode and band brake 22 is shifted into its braked mode. As such, sun gear 60 is braked and rotation of input shaft 12 causes power to be transferred through gearset 18 to output shaft 14 in both driving and coasting conditions with output shaft 14 driven at an increased speed ratio.

Figure 3:
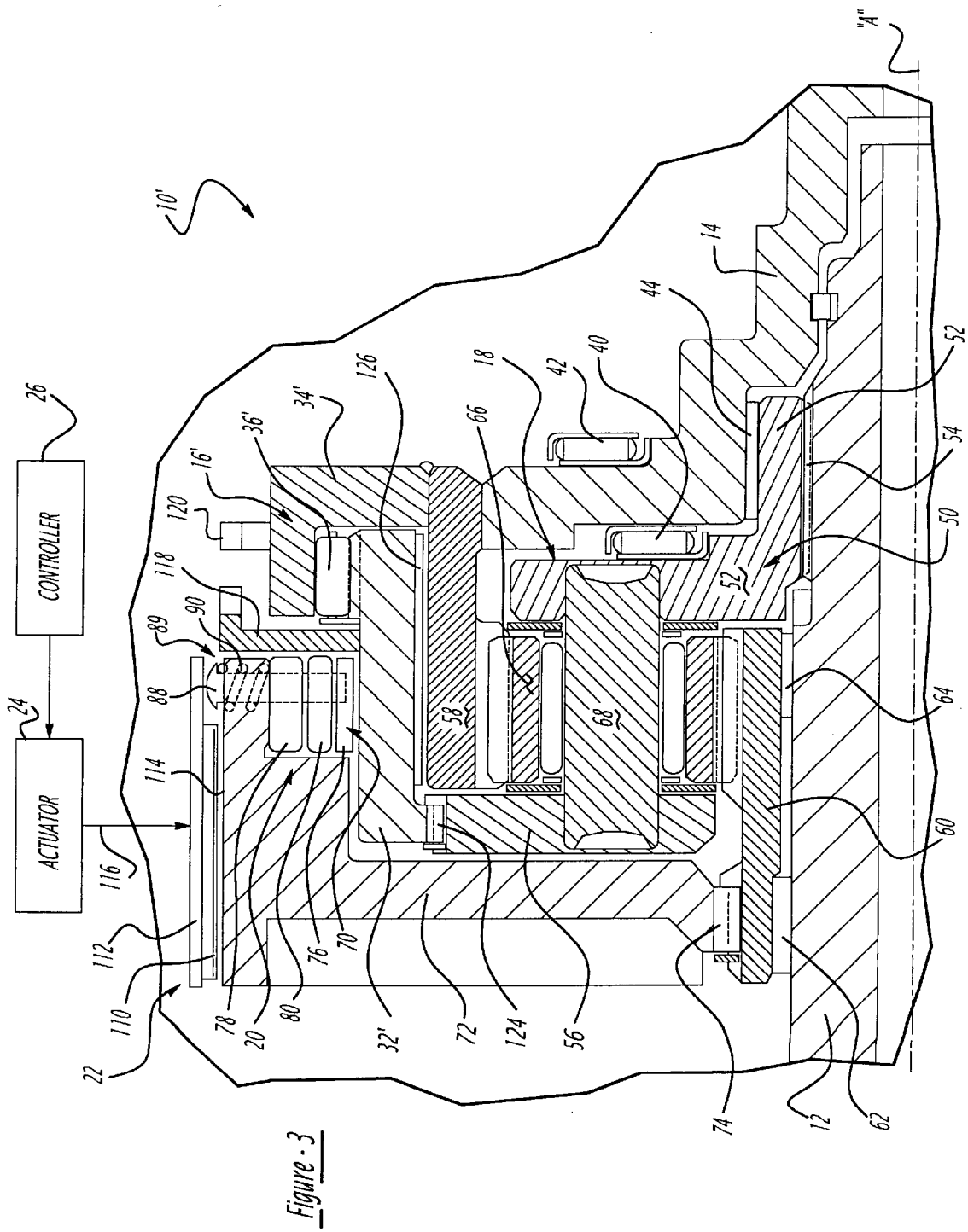
FIG. 3 is a sectional view illustrating a compounder assembly according to a second embodiment of the present invention.

Referring now to FIG. 3, a modified version of a compounder assembly, identified by reference numeral 10', is shown to be generally similar to compounder assembly 10 with the exception that first one-way clutch 16' is now installed between planet carrier 50 and ring gear 58 instead of directly between input shaft 12 and output shaft 14. As such, a more compact packaging is provided in association with compounder assembly 10'. For purposes of brevity, common reference numerals are used to identify those elements of compounder assembly 10' that are common or similar to those associated with compounder assembly 10.

As seen from FIG. 3, first one-way clutch 16' includes an inner race element 32' that is fixed to planet carrier 50, an outer race element 34' that is fixed to ring gear 58, and a set of locking elements 36' disposed therebetween. In particular, inner race element 32' is fixed for rotation with second carrier member 56' via a splined connection 124. A suitable bushing or bearing assembly 126 rotatably supports inner race element 32' for rotation relative to ring gear 58. Input tone wheel 118 is shown fixed to inner race element 32'. Outer race element 34' is fixed (i.e., welded) to ring gear 58 with output tone wheel 120 fixed thereto. Overrunning clutch assembly 70 is shown installed between inner race element 32' and brake drum 72.

When it is desired to operate compounder assembly 10' in a direct-drive mode for driving output shaft 14 at the same speed as input shaft 12, calipers 112 are located by actuator 24 in the direct-drive position such that band brake 22 is in its released mode and overrunning clutch assembly 70 is in its locked mode. Thus, direct rotary power is transferred from input shaft 12 through planet carrier 50 to inner race element 32' for driving outer race element 34' via locking elements 36'. In turn, outer race element 34' drives ring gear 58 and output shaft 14. Any relative rotation between output shaft 14 and input shaft 12 in the opposite direction such as, for example, during a coast condition, will be absorbed by overrunning clutch assembly 70. Operation of compounder assembly 10' in its over-drive mode is accomplished by moving calipers 112 to the over-drive position for shifting overrunning clutch assembly 70 into its released mode and shifting band brake 22 into its braked mode. As such, sun gear 60 is held stationary and rotation of input shaft 12 causes power to be transferred through gearset 18 to ring gear 58 which, in turn, drives output shaft 14.

Figure 5:
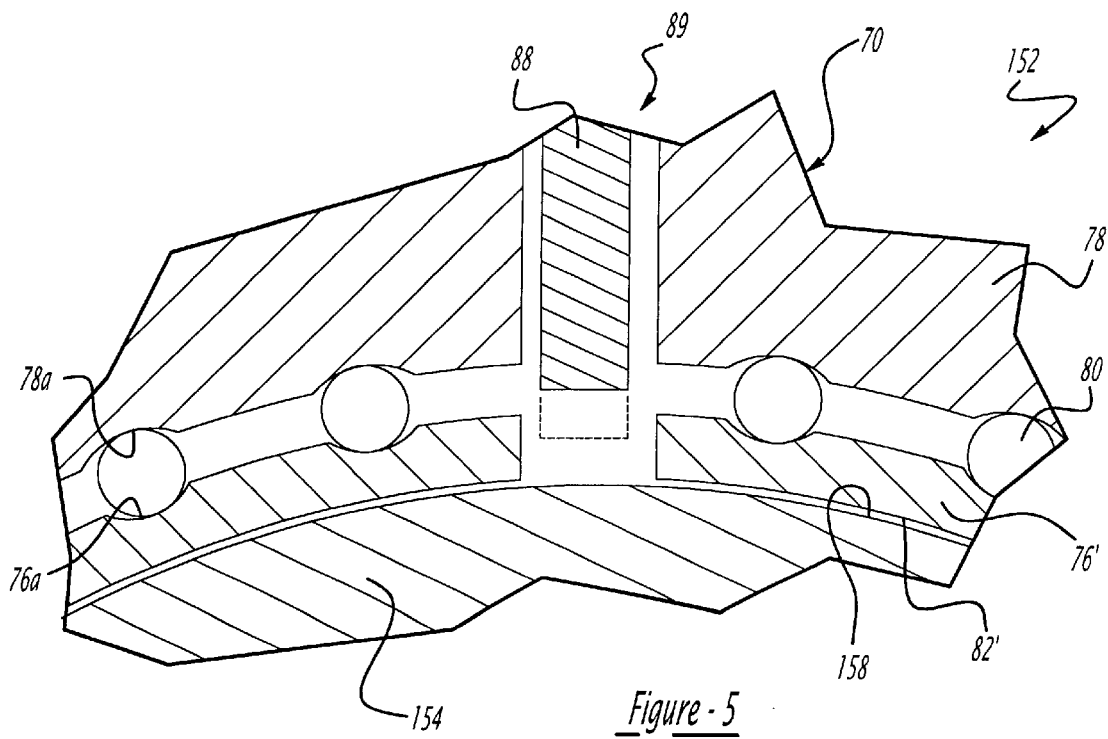
FIG. 5 is a partial sectional view of the controllable bi-directional clutch assembly associated with the compounder assembly of FIG. 4.
Figure 4:
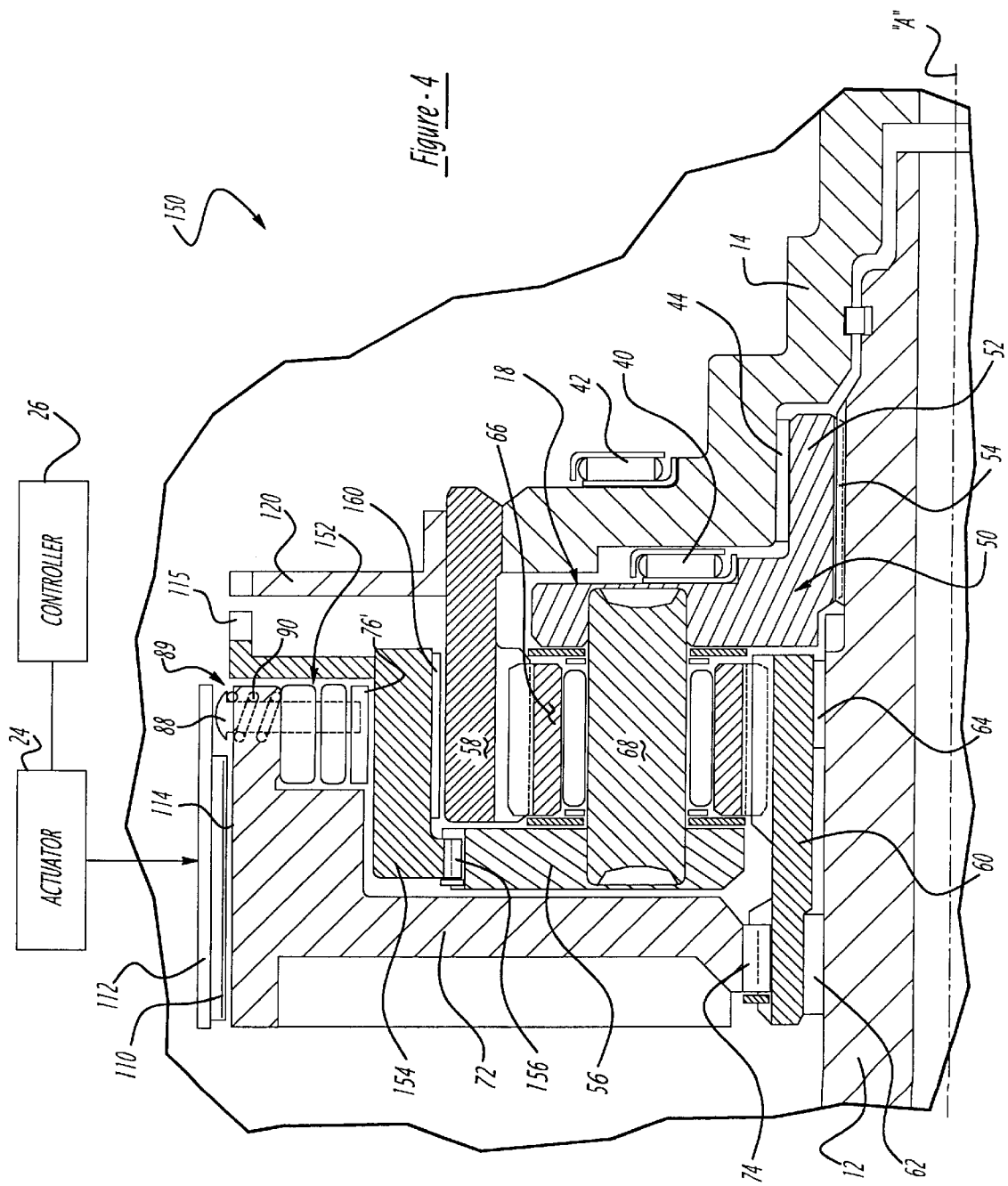
FIG. 4 is a sectional view illustrating a compounder assembly according to a third embodiment of the present invention.

Referring now to FIGS. 4 and 5, a compounder assembly 150 is shown to be a modified version of compounder assembly 10' with the exception that a "bidirectional" over-running clutch assembly 152 replaces overrunning clutch assembly 70 and one-way clutch 16 for establishing both the direct-drive and over-drive modes. Over-running clutch assembly 152 includes outer ring 78 which is fixed to brake drum 72, an inner ring 76' supported on a carrier drum 154 fixed via a splined connection 156 to second carrier ring 56, and rollers 80 retained in the roller pockets defined between inner ring 76' and outer ring 78. Inner cylindrical surface 82' of inner ring 76' is supported on an outer cylindrical surface 158 of carrier drum 154. A bushing or bearing assembly 160 supports carrier drum 154 for rotation relative to ring gear 58.

Bi-directional overrunning clutch assembly 152 is operable in its locked mode for preventing rotation of sun gear 60 relative to carrier 50 in both directions. This is accomplished by providing an inner ring 76' (FIG. 5) which is similar to inner ring 76 (FIG. 2) except that tang 79 has been removed. By eliminating tang 79 inner ring 76' is able to circumferentially index in both directions relative to outer ring 78 for causing locking elements 80 to engage opposed locking surfaces 76a, 78a, thereby coupling brake drum 72 to carrier drum 154 when pin 88 is in its first position. Thus, when pin 88 is located in its first position, locking in both direction occurs. Accordingly, when it is desired to operate compounder assembly 150 in its directdrive mode, actuator 24 locates calipers 112 in the direct-drive position and power is delivered from input shaft 12 through carrier 50, carrier drum 154 and overrunning clutch assembly 152 to brake drum 72. As such, sun gear 60 is driven at the same speed as carrier 50 such that ring gear 58 and output shaft 14 are driven at a direct speed ratio relative to input shaft 12. In this manner, drive loads are transferred through gearset 48 without speed reduction since there is no relative motion between its gear components. Compounder assembly 150 is shifted into its over-drive mode by moving calipers 112 to the over-drive position whereat bidirectional overrunning clutch assembly 150 is shifted into its released mode and band brake 22 is shifted into its braked mode. With pin 88 in its second position (shown in phantom) relative rotation between inner ring 76' and outer ring 78 is prevented for permitting bi-directional free-wheeling of carrier 50 relative to brake drum 72 which is held stationary by band brake 22.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimedas:

1. A compounder assembly comprising:
   an input shaft;
   an output shaft;
   a first clutch operable to provide a one-way locking function for coupling said input shaft to said output shaft;
   a planetary gearset including a sun gear, a ring gear fixed to said output shaft, a carrier fixed to said input shaft, and planet gears supported on said carrier and which are meshed with said sun gear and said ring gear;
   a brake drum fixed to said sun gear;
   a band brake operable in a released mode to permit rotation of said brake drum and in a braked mode to prevent rotation of said brake drum;
   a second clutch disposed between said brake drum and said carrier, said second clutch is operable in a locked mode to provide a one-way clutching function for preventing said carrier from overrunning said brake drum, and said second one-way clutch is further operable in a released mode to permit bi-directional free-wheeling between said brake drum and said carrier; and
   an actuator for shifting said second clutch into its locked mode and said band brake into its released mode to establish a first speed ratio drive connection between said input shaft and said output shaft, and said actuator is operable for shifting said second clutch into its released mode and said band brake into its braked mode to establish a second speed ratio drive connection between said input shaft and said output shaft.

2. The compounder assembly of claim 1 wherein said first clutch is a one-way clutch having an input member fixed to said input shaft, an output member fixed to said output shaft, and locking elements disposed between said input and output elements.

3. The compounder assembly of claim 1 wherein said first clutch is a one-way clutch having an input element fixed to said carrier, and output element fixed to said ring gear, and locking elements disposed between said input and output elements.

4. The compounder assembly of claim 1 wherein said brake drum includes a brake surface, and wherein said band brake includes a movable caliper having a friction surface, said caliper being located in a first position with said friction surface disengaged from said brake surface on said brake drum to define said released mode of said band brake, and said caliper is movable to a second position with said friction surface in engagement with said brake surface on said brake drum to define said braked mode of said band brake.

5. The compounder assembly of claim 4 further comprising a mode shift mechanism for shifting said second clutch between its locked and released modes in response to movement of said caliper between its first and second positions.

6. The compounder assembly of claim 5 wherein said second clutch is an overrunning clutch assembly comprising:
   an inner ring supported on said carrier and having a pair of end segments defining a slot therebetween, and a tang upstanding from one of said end segments adjacent to said slot;
   an outer ring fixed to said brake drum; and
   locking elements disposed in pockets formed between said inner ring and said outer ring.

7. The compounder assembly of claim 6 wherein said mode shift mechanism includes a pin extending through said outer ring for movement between a first position displaced from said slot in said inner ring and a second position retained in said slot, and a spring for biasing said pin to its first position, and wherein movement of said caliper from its first position to its second position acts to move said pin from its first position to its second position and define said released mode of said second clutch, said pin is operable in its second position to prevent relative rotation between said inner and outer rings for centering said locking elements in said pockets such that said inner ring is uncoupled from said carrier, and wherein movement of said caliper from its second position to its first position causes said spring to urge said pin to move from its second position to its first position and define said locked mode of said second clutch, said pin is operable in its first position to engage said tang and prevent relative rotation in a first direction between said inner and outer rings for centering said locking elements in said pockets such that said inner ring is uncoupled from said carrier, and said pin is further operable in its first position to permit relative rotation in a second direction between said inner and outer rings for causing said locking elements to engage locking surface portions of said pockets and couple said inner ring for rotation with said carrier.

8. A compounder assembly adapted for installation between a rotary input member and a rotary output member, comprising:
   a first overrunning clutch interconnected between the input and output members and operable to transfer drive power from the input member to the output member while permitting the output member to overrun the input member;
   a planetary gearset including a sun gear rotatably supported on the input member, a ring gear fixed for rotation with the output member, a carrier fixed for rotation with the input member, and planet gears supported by said carrier which are meshed with said sun gear and said ring gear;
   a brake drum fixed for rotation with said sun gear;
   a band brake selectively engageable with said brake drum and which is operable in a first position to permit rotation of said brake drum and in a second position to prevent rotation of said brake drum;
   a second overrunning clutch disposed between said brake drum and said carrier, said second overrunning clutch including a first ring fixed for rotation with said brake drum, a second ring supported on said carrier, and locking elements disposed in pockets formed between said first and second rings;
   a shift mechanism including a pin mounted to said first ring for movement between a first position and a second position, and a spring for biasing said pin toward its first position, said pin is operable in its first position to permit relative rotation between said first and second rings in a first direction for causing said locking elements to engage locking surfaces of said pockets to frictionally couple said second ring for rotation with said carrier, said pin is further operable in its first position to engage said second ring and prevent relative rotation between said first and second rings in a second direction for uncoupling said second ring from said carrier, said pin is operable in its second position to engage said second ring and prevent relative rotation between said first and second rings in both directions; and
   an actuator for moving said band brake between its first and second position for causing corresponding movement of said pin between its first and second positions, whereby a first speed ratio drive connection is established between the input and output members when said band brake and said pin are in their respective first positions, and a second speed ratio drive connection is established when said band brake and said pin are in their respective second positions.

9. The compounder assembly of claim 8 wherein said band brake is engageable with said pin such that movement of said band brake from its first position to its second position causes said pin to move from its first position to its second position, and movement of said band brake from its second position to its first position permits said spring to move said pin from its second position to its first position.

10. The compounder assembly of claim 8 wherein said second ring of said second overrunning clutch is a split ring having a pair of end segments defining a slot and an upstanding tang formed on one of said end segments adjacent to said slot, said pin is displaced from said slot when located in its first position and retained in said slot when located in its second position, said pin is further operable in its first position to engage said tang and prevent relative rotation between said first and second rings in said second direction.

11. A compounder assembly comprising:
   an input shaft;
   an output shaft;
   a planetary gearset including a sun gear, a ring gear fixed to said output shaft, a carrier fixed to said input shaft, and planet gears supported by said carrier which are meshed with said sun gear and said ring gear;
   a first clutch installed between said carrier and said ring gear and arranged to transfer rotary power from said carrier to said ring gear while permitting said ring gear to overrun said carrier;
   a brake drum fixed to said sun gear;
   a band brake operable in a released mode to permit rotation of said brake drum and in a braked mode to prevent rotation of said brake drum;
   a second clutch disposed between said brake drum and said carrier, said second clutch is operable in a locked mode to provide a one-way clutching function for preventing said carrier from overrunning said brake drum, and said second one-way clutch is further operable in a released mode to permit bi-directional free-wheeling between said brake drum and said carrier; and
   an actuator for shifting said second clutch into its locked mode and said band brake into its released mode to establish a first speed ratio drive connection between said input shaft and said output shaft, and said actuator is operable for shifting said second clutch into its released mode and said band brake into its braked mode to establish a second speed ratio drive connection between said input shaft and said output shaft.

12. The compounder assembly of claim 11 wherein said first clutch is a one-way clutch having an input race fixed to said carrier, an output race fixed to said ring gear, and locking element disposed in pockets formed between said input race and said output race.

13. The compounder assembly of claim 11 wherein said brake drum includes a brake surface, and wherein said band brake includes a movable caliper having a friction surface, said caliper being located in a first position with said friction surface disengaged from said brake surface on said brake drum to define said released mode of said band brake, and said caliper is movable to a second position with said friction surface in engagement with said brake surface on said brake drum to define said braked mode of said band brake.

14. The compounder assembly of claim 13 further comprising a mode shift mechanism for shifting said second clutch between its locked and released modes in response to movement of said caliper between its first and second positions.

15. The compounder assembly of claim 14 wherein said second clutch is an overrunning clutch assembly comprising:
   an inner ring supported on said carrier and having a pair of end segments defining a slot therebetween, and a tang upstanding from one of said end segments adjacent to said slot;

an outer ring fixed to said brake drum; and locking elements disposed in pockets formed between said inner ring and said outer ring.

16. The compounder assembly of claim 15 wherein said mode shift mechanism includes a pin extending through said outer ring for movement between a first position displaced from said slot in said inner ring and a second position retained in said slot, and a spring for biasing said pin to its first position, and wherein movement of said caliper from its first position to its second position acts to move said pin from its first position to its second position and define said released mode of said second clutch, said pin is operable in its second position to prevent relative rotation between said inner and outer rings for centering said locking elements in said pockets such that said inner ring is uncoupled from said carrier, and wherein movement of said caliper from its second position to its first position causes said spring to urge said pin to move from its second position to its first position and define said locked mode of said second clutch, said pin is operable in its first position to engage said tang and prevent relative rotation in a first direction between said inner and outer rings for centering said locking elements in said pockets such that said inner ring is uncoupled from said carrier, and said pin is further operable in its first position to permit relative rotation in a second direction between said inner and outer rings for causing said locking elements to engage locking surface portions of said pockets and couple said inner ring for rotation with said carrier.

17. A compounder assembly comprising:

an input shaft;

an output shaft;

a planetary gearset including a sun gear, a ring gear fixed to said output shaft, a carrier fixed to said input shaft, and pinion gears supported by said carrier and meshed with said sun gear and said ring gear;

a brake drum fixed to said sun gear;

a clutch disposed between said brake drum and said carrier, said clutch is operable in a locked mode to couple said carrier for rotation with said brake drum and is further operable in a released mode to uncouple said carrier for rotation relative to said brake drum;

a band brake operable in a released mode to permit rotation of said brake drum and in a braked mode to prevent rotation of said brake drum; and an actuator for shifting said clutch into its locked mode and said band brake into its released mode to establish a first speed ratio drive connection between said input shaft and said output shaft, and said actuator is operable for shifting said clutch into its released mode and said band brake into its braked mode to establish a second speed ratio drive connection between said input shaft and said output shaft.

18. The compounder assembly of claim 17 wherein said carrier includes a first carrier ring fixed to said input shaft and which is connected to a second carrier ring, said pinion gears supported on pinion shafts mounted between said first and second carrier rings, and wherein said carrier further includes a carrier drum fixed to said second carrier ring and rotatably supported on said ring gear.

19. The compounder assembly of claim 18 wherein said clutch includes a first clutch ring fixed to said brake drum, a second clutch ring supported on said carrier drum, locking elements disposed in pockets formed between said first and second clutch rings, and a shift member movable between a first position and a second position, said shift member is operable in its first position to permit limited relative rotation between said first and second clutch rings for causing said locking elements to engage lock surfaces in said pockets for frictionally clamping said second clutch ring to said carrier drum so as to establish said locked mode of said clutch, and said shift member is operable in its second position to prevent relative rotation between said first and second clutch rings for disengaging said locking elements from said lock surfaces to release said second clutch ring from clamped engagement with said carrier drum so as to establish said released mode of said clutch.

20. The compounder assembly of claim 19 wherein said shift member is a pin rotatable with said first clutch ring and which is biased by a spring toward its first position, and wherein said pin has an end segment displaced from a slot in said second clutch ring when said pin is located in its first position and which is retained in said slot when said pin is located in its second position.

21. The compounder assembly of claim 20 wherein said band brake includes a caliper that is movable between a first position and a second position, said caliper is displaced from said brake drum when located in its first position to permit rotation of said brake drum and establish said released mode and said caliper is engaged with said brake drum when located in its second position to prevent rotation of said brake drum and establish said braked mode, and wherein movement of said caliper from its first position to its second position causes corresponding movement of said pin from its first position to its second position.

22. The compounder assembly of claim 17 wherein said brake drum includes a brake surface, and wherein said band brake includes a movable caliper having a friction surface, said caliper being located in a first position with said friction surface disengaged from said brake surface on said brake drum to define said released mode of said band brake, and said caliper is movable to a second position with said friction surface in engagement with said brake surface on said brake drum to define said braked mode of said band brake.

23. The compounder assembly of claim 22 further comprising a mode shift mechanism for shifting said clutch from its locked mode into its released mode in response to movement of said caliper from its first position to its second position.

24. The compounder assembly of claim 23 wherein said clutch includes an outer clutch ring fixed for rotation with said brake drum, an inner clutch ring supported for rotation relative to said carrier, and locking elements retained in pockets formed between said outer and inner clutch rings, and wherein said mode shift mechanism includes a pin rotatable with said outer clutch ring and movable relative thereto between a first position disengaged from said inner clutch ring and a second position engaging said inner clutch ring, and a spring for biasing said pin toward its first position, said pin is operable in its first position to permit limited relative rotation between said inner and outer clutch rings for causing said locking elements to engage locking surface portions of said pockets and couple said inner clutch ring to said carrier to establish said locked mode, and said pin is operable in its second position to prevent relative rotation between said inner and outer clutch rings and release said locking elements from said lock surfaces to release said inner clutch ring from coupled engagement with said carrier to establish said released mode.

25. The compounder assembly of claim 24 wherein said caliper is engageable with said pin such that movement of said caliper from its first position to its second position causes movement of said pin from its first position to its second position.

\* \* \* \* \*

UNITED STATES PATENT AND TRADEMARK OFFICE
CERTIFICATE OF CORRECTION

PATENT NO.    : 6,149,543
DATED         : November 21, 2000
INVENTOR(S)   : Timothy W. Breen It is certified that error appears in the above-identified patent and that said Letters Patent is hereby corrected as shown below:

Column 1,
Line 34, after "includes" insert -- a --.
Line 35, "verdrive" should be -- overdrive --.
Line 38, "earset" should be -- gearset --.
Line 54, "directratio" should be -- direct ratio --.

Column 2,
Line 46, after "sectional" insert -- view --.

Column 4,
Line 17, "a" should be -- an --.

Column 7,
Line 57, "claimedas" should be -- Claimed Is --.

Column 8,
Line 28, "and" should be -- an --.

Signed and Sealed this

Eleventh Day of March, 2003

JAMES E. ROGAN
*Director of the United States Patent and Trademark Office*